United States Patent
Han et al.

(10) Patent No.: US 10,817,311 B1
(45) Date of Patent: Oct. 27, 2020

(54) APPLYING MACHINE LEARNING IN STORAGE SYSTEM CODE LOAD PROBLEM ANALYSIS

(71) Applicant: International Business Machines Corporation, Armonk, NY (US)

(72) Inventors: Robin Han, San Jose, CA (US); Edward H. Lin, Tucson, AZ (US); Mingzhi Zhao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/541,136

(22) Filed: Aug. 14, 2019

(51) Int. Cl.
   *G06F 9/44* (2018.01)
   *G06F 9/445* (2018.01)
   *G06K 9/62* (2006.01)
   *G06N 20/00* (2019.01)

(52) U.S. Cl.
   CPC ....... *G06F 9/44521* (2013.01); *G06K 9/6257* (2013.01); *G06N 20/00* (2019.01)

(58) Field of Classification Search
   None
   See application file for complete search history.

(56) References Cited

U.S. PATENT DOCUMENTS

| 9,684,493 B2 | 6/2017 | Boehm et al. |
| 9,898,393 B2 | 2/2018 | Moorthi et al. |
| 2007/0226386 A1 * | 9/2007 | Sharp .................. G06F 13/385 710/62 |
| 2016/0127768 A1 * | 5/2016 | Li .................. H04N 21/43615 725/80 |
| 2018/0307945 A1 | 10/2018 | Haigh et al. |

OTHER PUBLICATIONS

Anonymous, "Continuous Integration System that Leverages Machine Learning to Diagnose Build Failures" dated Nov. 22, 2013, IP.com No. IPCOM000232626D, Total 5 pages.
Anonymous, "A System and Method to Recommend Personalized Learning/Development Needs Based on Automated Code Review Findings/Patterns" dated Sep. 8, 2016, IP.com No. IPCOM000247463D, Total 3 pages.
Anonymous, "Applying Machine Learning Techniques to Determine Product Risks", dated Jan. 7, 2019, IP.com No. IPCOM000256883D, Total 29 pages.
Bughin et al., "Artificial Intelligence the Next Digital Frontier" dated Jun. 2017, Mckinsey Global Institute, Total 80 pages.

* cited by examiner

*Primary Examiner* — Craig C Dorais
(74) *Attorney, Agent, or Firm* — David W. Victor; Konrad, Raynes, Davda and Victor LLP

(57) ABSTRACT

Provided are a computer program product, system, and method for applying a machine learning algorithm to problem analysis in a code load operation of a data storage system. A code load driver is provided that receives code load operation information for an event during a code load operation in the storage system. The code load operation information indicates an error in the code load operation at a time of the event. A portion of the code load inform is processed by a machine learning to obtain a label indicating whether to halt the code load operation. In response to a label indicating the code load operation is to be halted, the code load operation is halted.

22 Claims, 4 Drawing Sheets

APPLYING MACHINE LEARNING IN STORAGE SYSTEM CODE LOAD PROBLEM ANALYSIS

BACKGROUND OF THE INVENTION

1. Field of the Invention

The present invention relates to a computer program product, system, and method for determining whether to suspend a code load operation in storage systems.

2. Description of Related Art

Many data storage systems store critical data that must be available to other systems at all times. Periodically, a data storage system requires software and firmware updates. Since the stored data must be accessible at all times, the data storage system remains in an operational mode and continues to process I/O transactions with hosts during a code load operation that performs the update. When a hardware failure or a software defect is encountered during a code load operation, a code load program needs to perform problem analysis and determine whether the code load operation should continue or should be suspended in order to prevent a loss of redundancy. The current method to make this decision in a code load program is to predefine all possible problems that can occur and the outcome for each problem (to continue or to suspend). As the problems arise during a code load process, the program takes actions according to their predefined outcomes to the problems.

SUMMARY

Provided are a computer program product, system, and method for applying a machine learning algorithm to problem analysis in a code load operation of a data storage system. Code load operation information for an event during a code load operation in the storage system is received. The code load operation information indicates an error in the code load operation at a time of the event. A portion of the code load information is processed by a machine learning module to obtain a label indicating whether to halt the code load operation. In response to a label indicating the code load operation is to be halted, the code load operation is halted.

DETAILED DESCRIPTION

As discussed, many data storage systems store critical data that must always be available to other systems. Periodically, a data storage system requires software and firmware updates. Since the stored data must be accessible at all times, the data storage system remains in an operational mode and continues to process I/O transactions with hosts during a code load operation that performs the update. When a hardware failure or a software defect is encountered during a code load operation, a code load program needs to perform problem analysis and determine whether the code load operation should continue or should be suspended in order to prevent a loss of redundancy. The current method to make this decision in a code load program is to predefine all possible problems that can occur and the outcome of each for each problem (to continue or to suspend). As the problems arise during a code load process, the program takes actions according to their predefined outcomes to the problems.

One drawback to this method is inaccuracy. As the scenarios get more complex, predefined outcomes can cause more false positives or false negatives. Another drawback is maintainability. As newer functions are added to the system, and interactions between components change, predefined problems and outcomes can become inaccurate and/or obsolete. Furthermore, maintaining all possible system problems is costly for development and testing. A program that can improve accuracy and reduce maintenance and/or development work is desired.

A code load driver, in accordance with some embodiments, applies machine learning technology to a code load process performed by a storage system. More specifically, the decision to continue or to suspend a code load operation when a code load event occurs may be considered a typical classification problem. In machine learning, a classification problem is solved by an algorithm that takes in different features and weight of each feature; and generates an output or a label to classify the features. In a code load operation in accordance with some embodiments, the label indicates whether to continue or to suspend the code load operation. All code load operations generate code load operation data or information based on events that occur during the code load operation. As such, a machine learning algorithm can be "trained" and improved by using code load data or information for events from previous code load operations. The trained machine algorithm may then be deployed to a data storage system as part of the code load driver or program. When an event, such as a problem, arises during a code load operation, the code load driver may apply the machine learning algorithm on the code load operation information for the event to determine the outcome (continue or suspend) based on different features from the code load data. The above and other features of the described embodiments are described below with reference to the drawings.

Figure 1:
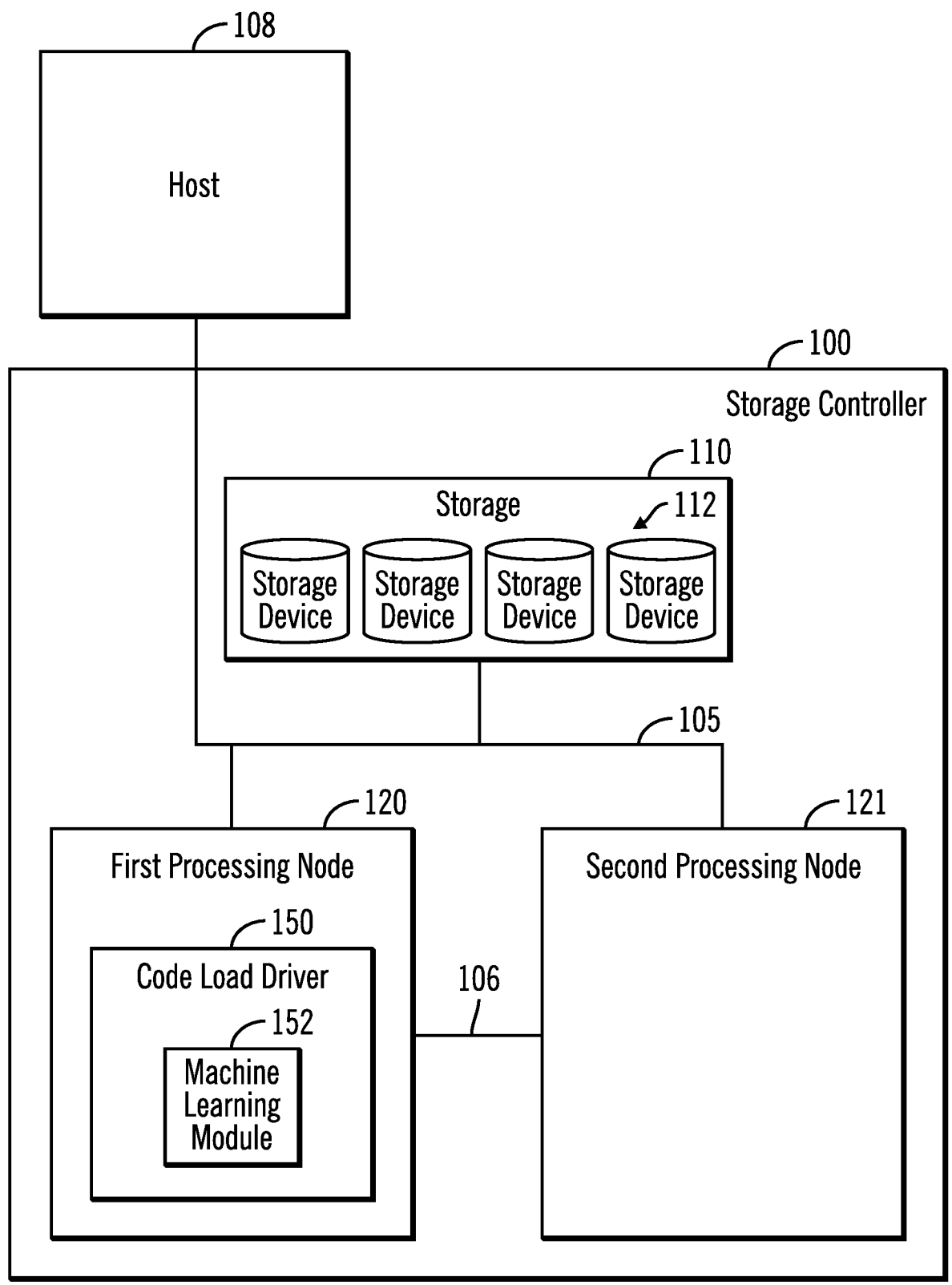
FIG. 1 illustrates an embodiment of a storage system.

FIG. 1 illustrates a storage controller 100. The storage controller 100 is connected to a host device 108 that accesses storage system to store and retrieve data. Although one host device 108 is shown, it is possible for two or more host devices to the storage controller 100 in other embodiments. Storage controller 100 includes an array of independent network nodes 120 and 121, such as a central electronics complex (CEC), that each connect to a bus interface 105, such as a Peripheral Component Interconnect Express (PCIe) bus to communicate with a storage array 110. The network nodes 120 and 121 may also communicate with each other directly over a link 106, such as a PCIe bus. Although two network nodes 120 and 121 are shown it is possible to have any number of processes in the described embodiment. Host systems, such as host 108, may connect to the storage controller 100 through via bus interface 105. A storage array 110 includes a plurality of storage devices 112 in which logical volumes and tracks are configured. The network nodes 120 and 121 communicate with the storage array 110 to read data from and write data to the storage devices 112.

Each network node 120 and 121 executes software instructions to perform processes that perform network functions. As shown, network node 120 provides a code load driver 150 that performs code load operations on various components in storage controller 100. The code load driver 150, in turn, includes a machine learning module 152, that determines whether code load operation information for an event indicates the code load operation should continue or be suspended. In some embodiments, the code load driver 150 and/or machine learning module 152 may be a distributed process being provided on more than one network such as both nodes 120 and 121. In accordance with some other embodiments, the machine learning module 152 may be external to the code load driver 150, and may be implemented in software or a separate hardware device invoked by the code load driver 150.

The machine learning module 152 is trained using a training data set that includes pairs of corresponding code load operation information for a code load event and an action (continue or suspend) to take based on the code load operation information. The machine learning module 52 is trained to output a label for inputs comprising code load operation information for a code load event based on whether performing the code load operation information produces an outcome satisfying a threshold.

In one embodiment, the machine learning module 152 may comprise artificial neural network programs. In neural network implementations, weights and biases in a hidden layer of nodes would be assigned to these inputs to indicate their predictive quality in relation to other of the inputs based on training to reach desired output labels for code load operation information for code load events to determine whether the code load operation should continue or be suspended.

Each neural network may be trained using backward propagation to adjust weights and biases at nodes in a hidden layer to produce adjusted outputs of labels for the code load events and which code load operation information produces outcomes satisfying outcome thresholds. A margin of error may be determined with respect to the actual output label from the machine learning module 152 and an expected output based on system performance and outcomes to train the machine learning module 152 to produce the desired output value based on a calculated expected output. In backward propagation, the margin of error of the output is measured and the weights and biases at nodes in the hidden layer are adjusted accordingly to decrease the error. Backward propagation may comprise an algorithm for supervised learning of artificial neural networks using gradient descent. Given an artificial neural network and an error function, the method may calculate the gradient of the error function with respect to the neural network's weights and biases.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 112 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 112 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

A storage controller in accordance with some embodiments is described above with reference to FIG. 1. However, some components have been omitted for brevity and clarity. Furthermore, storage controllers with different configurations are possible in accordance with various other embodiments.

Figure 2:
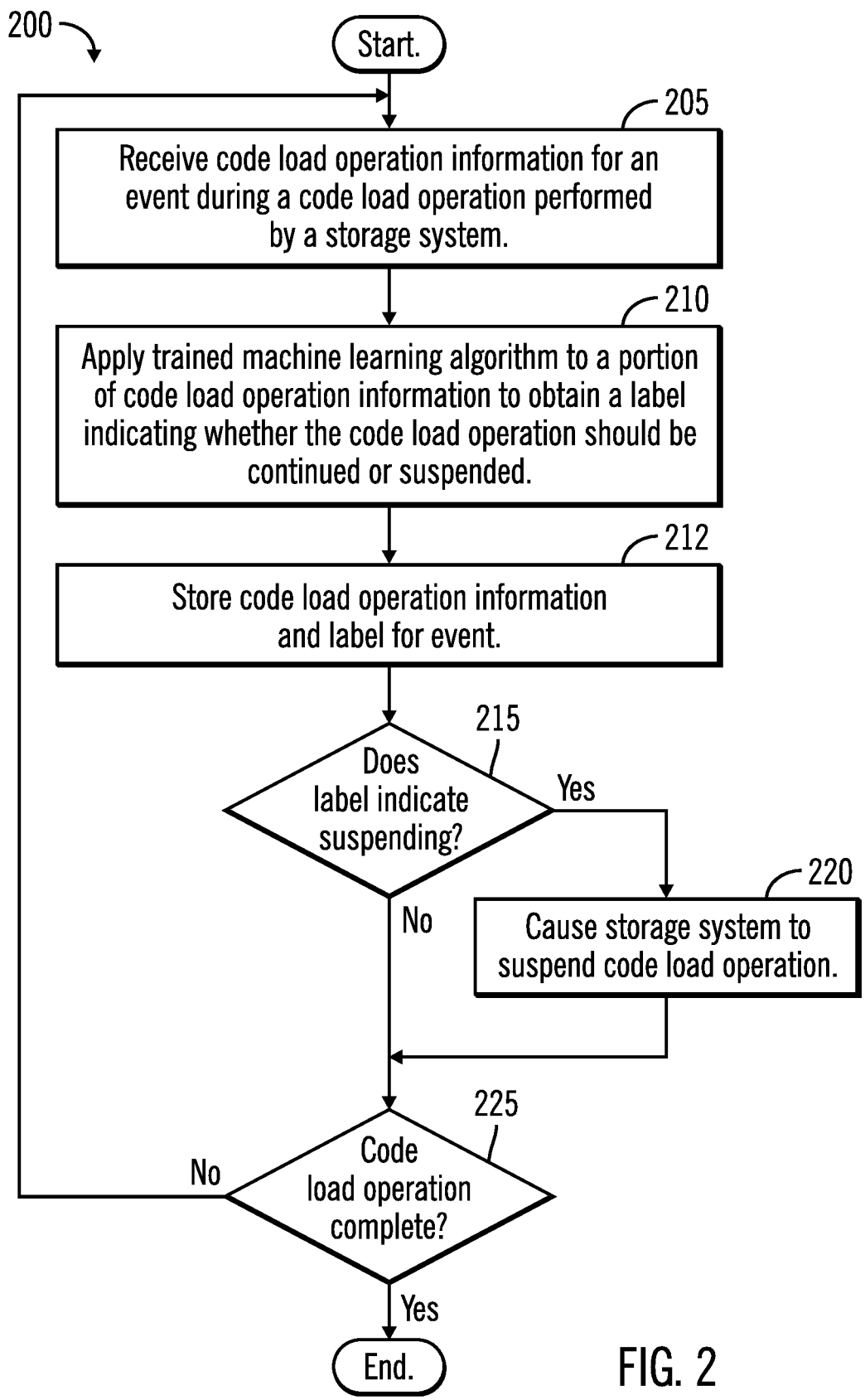
FIG. 2 illustrates an embodiment of operations performed by a code load drive to analyze a code load event during a code load operation using a machine learning algorithm.

FIG. 2 illustrates a flow diagram of a process performed by the code load driver to determine whether to continue or suspend a code load operation in response to a code load operation event in accordance with an embodiment. In process 200, code load operation information for a code load event is received by the code load driver (205). A code load event is an unexpected action that occurs as a result of a code load operation. Examples of code load event s include, but are not limited to, a hardware failure and a software defect resulting in an error being generated. The code load operation information is information that describes the storage system status at the time of the event. The code load operation information may include, but is not limited to, machine model, code level, detected activities, and/or on-going system activities. A trained machine learning module 152 processes the code load operation information to determine a label for the code load operation information that indicates whether to continue or suspend the code load operation (210). The machine learning module 152 may perform any type machine learning algorithm that can be used for classification of input information. The machine learning module 152 used in process 200 is a logistic regression algorithm. However, various embodiments may use other types of machine learning algorithms including, but not limited to, linear regression, a decision tree, and a multiclass classification algorithm.

The code load operation information and the label for the information determined by the machine learning module 152 are stored in memory and/or sent to a central system for future use in training the machine learning algorithm (212). The process 200 then determines whether the determined label indicates that the code load operation should be suspended (215). If the code load operation should be suspended, the code load driver suspends the code load operation (220). If the code load operation is not suspended, the process determines if the code load operation is complete. If the code load operation is complete, the process 200 ends. Otherwise, the process 200 repeats when code load operation information from a subsequent code load event is received.

The above is a description of a process performed by a code load driver to determine whether to suspend or continue a code load operation in response to a code load event in accordance with the described embodiment. Other processes that add, combine, and/or remove steps of the described process are possible in other embodiments.

Figure 3:
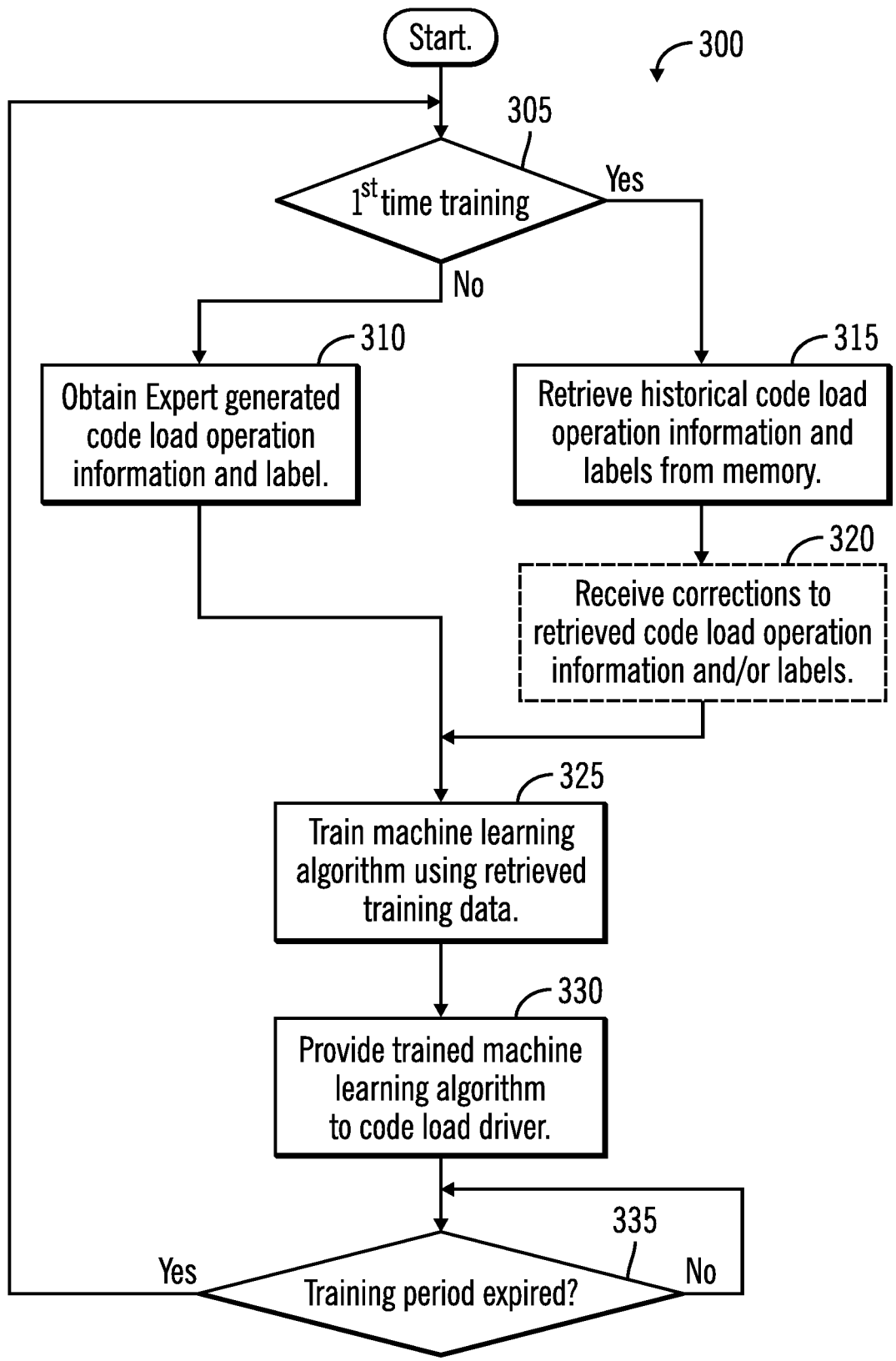
FIG. 3 illustrates an embodiment of operations performed by a processing system to train a machine learning algorithm.

Prior to use in determining whether a code load operation should be suspended in response to a code load event, the machine learning module 152 must be trained. Furthermore, the machine learning module 152 may be periodically retrained using the results of previous classification to improve the accuracy of the applications. FIG. 3 illustrates a flow diagram of a process that may be performed by a system that generates the machine learning module and/or by the code load driver to train a machine learning module 152 in accordance with an embodiment of the invention.

In process 300, if the machine learning algorithm is being trained for the first time (305), training data that includes generated code load operation information and corresponding labels is retrieved (310) to be the training data set for the machine learning module 152. If this is not the first time the machine learning module 152 is being trained, historical code load operation information and corresponding labels determined by the machine learning module 152 are retrieved from memory (315) to be the training data set. Optionally, the retrieved historical code load operation information and corresponding labels may be reviewed by a user that may enter corrections to the labels to improve the performance of the machine learning module 152 (320).

The retrieved and/or correct training data set is used to train the machine learning module 152 (325). The retraining allows the machine learning module 152 to add and/or remove input features that do meet a certain threshold of significance in accordance with some embodiments.

The trained machine learning module 152 is then provided from the system performing the training to one or more code load drivers for use in code load operations (330). The process may then wait for a certain predefined training period and then repeat to retrain the machine learning algorithm with new information (335).

A process for training a machine learning module 152 in accordance with the described embodiment is described above with reference to FIG. 3. Other processes that train a machine learning module that add, combine, and/or remove steps are possible in other embodiments.

Figure 4:
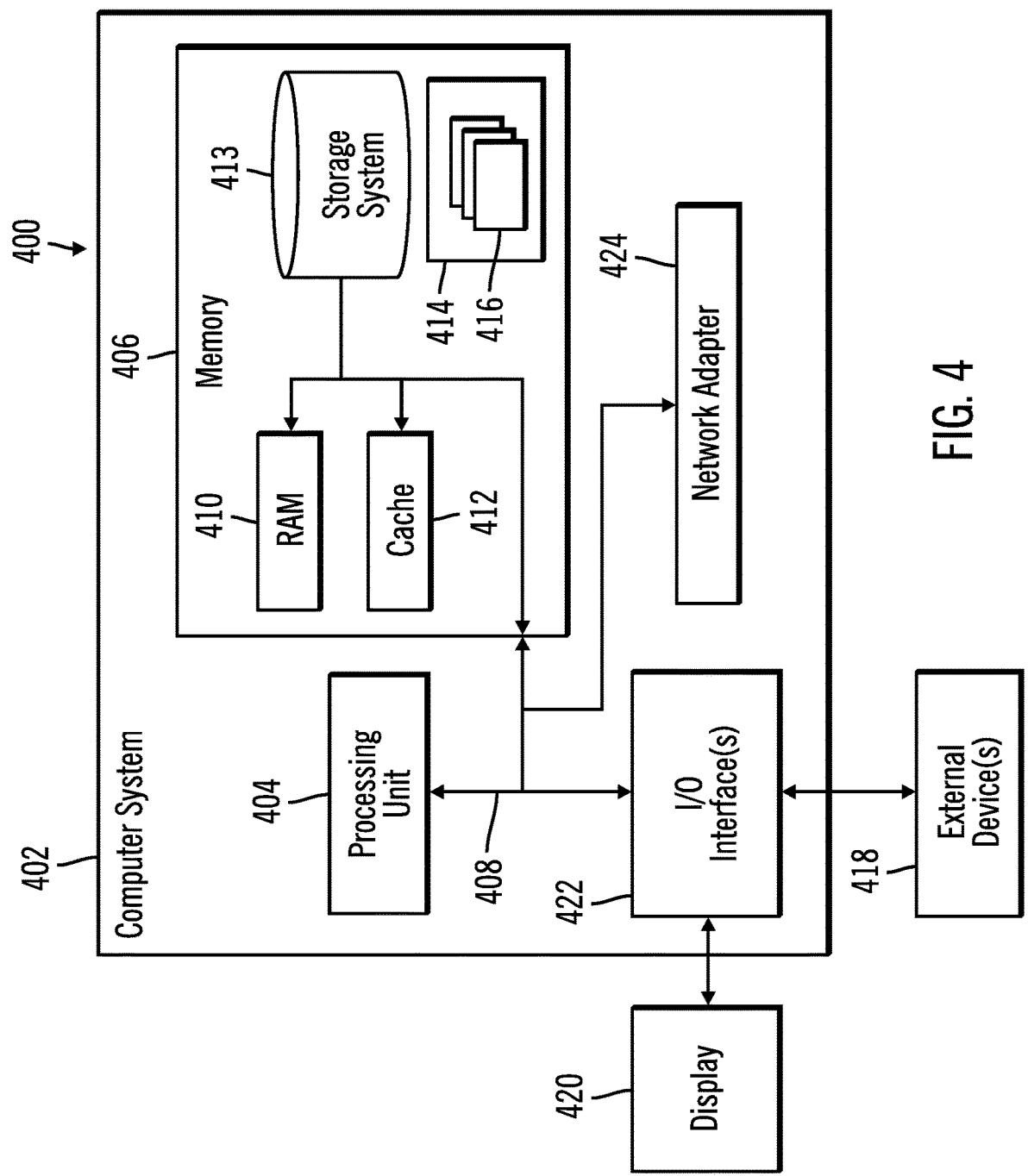
FIG. 4 illustrates an embodiment of a computer system executing instructions to provide a data manager.

FIG. 4 illustrates a computing environment 400 in accordance with certain embodiments. Referring to FIG. 4, computer node 402 is only one example of a suitable computing node and is not intended to suggest any limitation as to the scope of use or functionality of embodiments of the invention described herein. Regardless, computer node 402 is capable of being implemented and/or performing any of the functionality set forth hereinabove.

The computer node 402 may be a computer system, which is operational with numerous other general purpose or special purpose computing system environments or configurations. Examples of well-known computing systems, environments, and/or configurations that may be suitable for use with computer node 402 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 402 may be described in the general context of computer system executable instructions, such as program modules, being executed by a computer system. Generally, program modules may include routines, programs, objects, components, logic, data structures, and so on that perform particular tasks or implement particular abstract data types. Computer node 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer node 402 is shown in the form of a general-purpose computing device. The components of computer node 402 may include, but are not limited to, one or more processors or processing units 404, a system memory 406, and a bus 404 that couples various system components including system memory 428 to one or more processors or processing units 404.

Bus 404 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 402 typically includes a variety of computer system readable media. Such media may be any available media that is accessible by computer node 402, and it includes both volatile and non-volatile media, removable and non-removable media.

System memory 406 can include computer system readable media in the form of volatile memory, such as random access memory (RAM) 410 and/or cache memory 412. Computer node 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, system memory 406 may include at least one program product 414 having a set (e.g., at least one) of program modules 416 that are configured to carry out the functions of embodiments of the invention.

Program/utility 414, having a set (at least one) of program modules 416, may be stored in system memory 406 by way of example, and not limitation, as well as an operating system, one or more application programs, other program modules, and program data.

Each of the operating system, one or more application programs, other program modules, and program data or some combination thereof, may include an implementation of a networking environment. Program modules 416 generally carry out the functions and/or methodologies of embodiments of the invention as described herein.

Computer node 402 may also communicate with one or more external devices 418 such as a keyboard, a pointing device, a display 420, etc.; one or more devices that enable a user to interact with computer node 402; and/or any devices (e.g., network card, modem, etc.) that enable computer node 402 to communicate with one or more other computing devices. Such communication can occur via Input/Output (I/O) interfaces 422. Still yet, computer node 402 can communicate with one or more networks such as a local area network (LAN), a general wide area network (WAN), and/or a public network (e.g., the Internet) via network adapter 424. As depicted, network adapter 424 communicates with the other components of computer node 402 via bus 408. It should be understood that although not shown, other hardware and/or software components could be used in conjunction with computer node 402. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer program product for performing a code load operation in a storage system, the computer program product comprising a computer readable storage medium having a code load driver and a machine learning module embodied therein that are executed to perform operations, the operations comprising:
receiving, in the code load driver, code load operation information for an event during a code load operation in the storage system where the code load operation information indicates an error in the code load operation at a time of the event;
processing, by a machine learning module, a portion of the code load operation information to obtain a label indicating whether to halt the code load operation; and
causing, by the code load driver, the code load operation to halt in the storage system in response to obtaining the label indicating the code load operation is to be halted.

2. The computer program product of claim 1 wherein the operations further comprise:
obtaining code load operation information for a plurality of previously performed code load operations; and
training the machine learning module with the code load operation information for the plurality of previously performed code load operations.

3. The computer program product of claim 1 wherein the machine learning module uses a logistic regression algorithm.

4. The computer program product of claim 1 wherein the machine learning module uses a machine learning algorithm selected from the group consisting of: linear regression, a decision tree, and a multiclass classification algorithm.

5. The computer program product of claim 1 wherein the code load operation information includes one or more types of information selected from the group consisting of: machine model, code level, detected activities and on-going system activities.

6. The computer program product of claim 1 wherein the operations further comprise:
storing, by the code load driver, the code load operation information and the label determined for the code load operation for the event in a memory; and
retraining the machine learning module with a new training set of data that includes the code load operation information and label.

7. The computer program product of claim 1 wherein the operations further comprise:
receiving an input of a correction to one of the code load operation information and the label; and
storing the code load operation information and label in memory for use in a training set of data to retrain the machine learning module.

8. The computer program product of claim 1 wherein the operations further comprise:
receiving an input of an initial training set of data including user generated code load operation information and associated labels; and
initially training the machine learning module with the initial training set of data.

9. A system for performing a code load operation in a storage system comprising:
a processor;
a machine learning module;
a computer readable storage medium having a code load driver embodied therein that when executed by the processor performs:
receiving code load operation information for an event during a code load operation in the storage system where the code load operation information indicates an error in the code load operation at a time of the event;
applying the machine learning module to process a portion of the code load operation information to obtain a label indicating whether to halt the code load operation; and causing the code load operation to halt in the storage system in response to obtaining the label indicating the code load operation is to be halted.

10. The system of claim 9 wherein the processor further performs:
   obtaining code load operation information for a plurality of previously performed code load operations; and
   training the machine learning module with the code load operation information for the plurality of previously performed code load operations.

11. The system of claim 9 wherein the machine learning module uses a logistic regression algorithm.

12. The system of claim 9 wherein the machine learning module uses a machine learning algorithm selected from the group consisting of: linear regression, a decision tree, and a multiclass classification algorithm.

13. The system of claim 9 wherein the code load operation information includes one or more types of information selected from the group consisting of: machine model, code level, detected activities and on-going system activities.

14. The system of claim 9 further comprising:
   a memory; and
   wherein the processor further performs:
      storing the code load operation information and the label determined for the code load operation for the event in a memory; and
      retraining the machine learning module with a new training set of data that includes the code load operation information and label.

15. The system of claim 14 wherein the processor further performs:
   receiving an input of a correction to one of the code load operation information and the label; and
   storing the code load operation information and label with the correction in the memory for use in a training set of data to retrain the machine learning module.

16. A method for performing a code load operation in a storage system comprising:
   receiving, by a code load driver, code load operation information for an event during a code load operation in the storage system where the code load operation information indicates an error in the code load operation at a time of the event;
   processing, by a machine learning module, a portion of the code load operation information to obtain a label indicating whether to halt the code load operation; and
   causing, using the codeload driver, the code load operation to halt in the storage system in response to obtaining the label indicating the code load operation is to be halted.

17. The method of claim 16 further comprising:
   obtaining code load operation information for a plurality of previously performed code load operations; and
   training the machine learning module with the code load operation information for the plurality of previously performed code load operations.

18. The method of claim 16 wherein the machine learning module uses a logistic regression algorithm.

19. The method of claim 16 wherein the machine learning module uses a machine learning algorithm selected from the group consisting of: linear regression, a decision tree, and a multiclass classification algorithm.

20. The method of claim 16 wherein the code load operation information includes one or more types of information selected from the group consisting of: machine model, code level, detected activities and on-going system activities.

21. The method of claim 16 further comprising:
   storing, by the code load driver, the code load operation information and the label determined for the code load operation for the event in a memory; and
   retraining the machine learning module with a new training set of data that includes the code load operation information and label.

22. The method of claim 21 further comprising:
   receiving an input of a correction to one of the code load operation information and the label; and
   storing the code load operation information and the label with the correction in the memory for use in a training set of data to retrain the machine learning module.

* * * * *